United States Patent Office 3,280,450
Patented Oct. 25, 1966

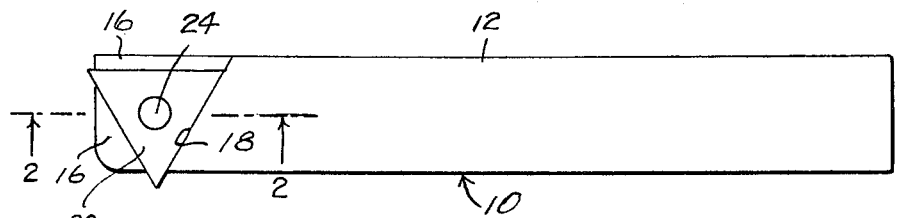
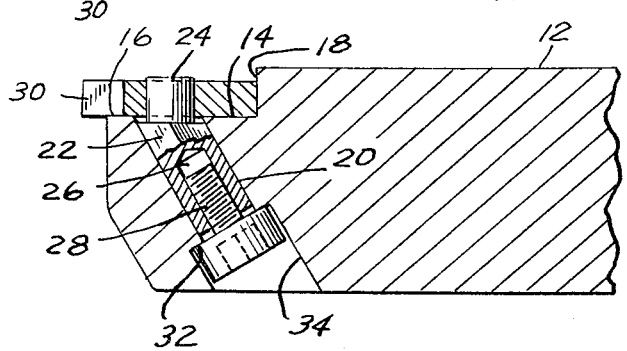
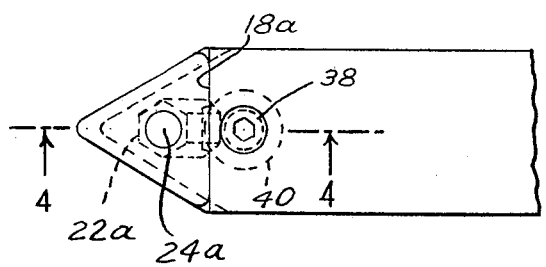
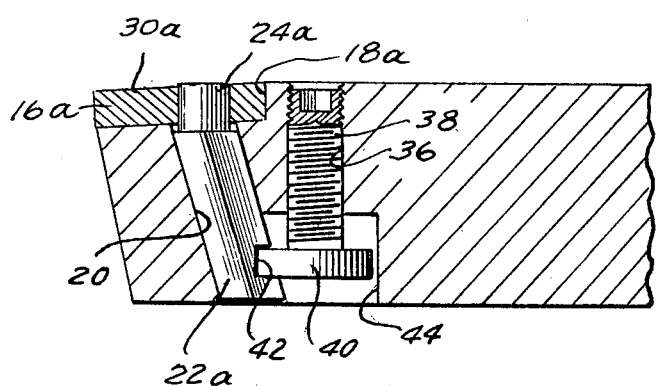
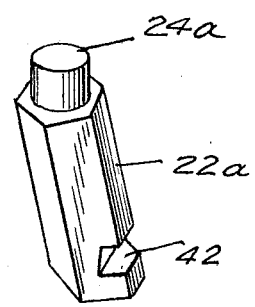

3,280,450
TOOL HOLDER FOR CUTTER ELEMENT
Frank Sirola, % Aloris Tool Co., Inc., 419 Getty Ave.,
Clifton, N.J.
Filed June 9, 1964, Ser. No. 373,736
1 Claim. (Cl. 29—96)

This invention relates to cutting tools for lathes and the like and, in particular, to such tools which retain cutting elements having a plurality of cutting edges, normally carbide tips, that may be brought selectively into operative position as previously used edges become unserviceable.

One object of the invention is to provide a cutting tool the holder and cutting element of which are specially arranged to facilitate their assembly and disassembly.

Another object of the invention is to provide a cutting tool having a simplified means of assembly that will not sacrifice the operative stability and security of the cutter element.

It is, of course, recognized that precision cutting in lathes requires an absolutely rigid attachment between the cutter holder and the cutting element. In practice, it has been found that such operative security frequently involves a rather elaborate retention arrangement of the two components which involves uneconomic loss of time on the part of the operation in changing over to a new edge.

In general, the invention contemplates the employment of a non-rotatable pin angularly disposed within a hole in the shank of the cutting tool and having an extension freely protruding through a central aperture in the cutting element resting in a recess at one end of the tool. Threaded clamping means impinging on the pin are then arranged to exert a force on the pin in such a manner that the pin extension exerts a combined lateral and downward force on the cutting element in the recess of the shank. As a consequence the connection between the holder and cutting element is absolutely secure and yet mere release of the clamp permits the operator to easily remove and replace the element as desired.

Other objects and advantages of the invention may be appreciated on reading the following detailed description of several embodiments thereof which is taken in conjunction with the accompanying drawings in which:

FIGURE 1 is a plan view of the cutting tool;
FIGURE 2 is a section in enlarged scale taken on the line 2—2 of FIGURE 1;
FIGURE 3 is a plan view of a modified form of the invention;
FIGURE 4 is a section in enlarged scale taken on the line 4—4 of FIGURE 3; and
FIGURE 5 is a perspective showing the modified pin construction.

As shown in the drawings, the cutting tool 10 is composed of a shank 12 having a recess 14 which is formed of a flat base 16 and vertical shoulder 18. The shank is also provided with a hexagonal shaped inclined bore 20 extending through the shank and communicating with the base formed in the recess 14. The bore 20 is adapted to receive pin 22 extending at one end nearly to the bottom of the bore and providing at its top end an offset extension 24 of reduced diameter which protrudes above the base 16. The pin 22 and bore 20 are of complementary formation being hexagonal or of other non-circular shape in cross section so as to prevent turning of the pin 22 but permitting of movement longitudinally of the bore 20. Triangular shaped cutting element 30, which is centrally apertured, is disposed in the recess 14 with the extension 24 of the pin extending through the aperture. One side of the element 30 is in touching engagement with the shoulder 18 flanking one side of the recess.

The bottom of pin 22 has an internally threaded bore 26. A screw 28 is disposed within the bore. It is apparent that as the screw 28 is turned as by an Allen wrench inserted into its head, it will move into the bore 26 until its head contacts the shoulder 32 formed by counterbore 34 communicating with the bore 26, after which the pin 22 is pulled by the screw in a generally downward sloping direction. As a result, the frictional engagement of the pin extension in the central aperture of the cutting element causes the latter to be forced against the bottom of the base 16 of the recess and against the shoulder 18. The element becomes in effect wedged between the base and the shoulder of the recess so as to permit it to successfully withstand heavy cutting thrust during operation.

As shown in the modified version of the invention disclosed in FIGURES 4 and 5, the hexagonal pin 22a is a solid component throughout and has an angularly offset extension 24a projecting through the central aperture of the cutting element 30a. Proximate the bore 22a in the nose end of the cutting tool is a vertically tapped bore 36 in which there is provided a screw 38 having an enlarged flanged member 40 coacting with a transverse slot 42 in the pin 22a. Clockwise rotation of the screw causes the pin 22a to move downwardly in the inclined slot 20 and wedges the cutting element 30a between the base 16a and the vertical shoulder 18a of the recess formed in the end of the cutting tool. The shank has a bottom cutout region 44 to receive the member 40 a peripheral portion of which is disposed within the slot 42 provided in the pin 22a.

It is apparent that the cutting tool designed in accordance with the invention with its cutting element tightly secured between contiguous walls defining a recess in the nose end of its shank is a precision instrument which is nevertheless of simple manufacture and application in operation. Various other modifications of the invention may be effected by persons skilled in the art without departing from the principle and scope of invention as defined in the appended claim.

I claim:

A tool holder for a cutter insert comprising, a shank adapted to be held by a cutting machine, a recess formed in the upper face of said shank extending inwardly from one end thereof, said recess providing a base extending longitudinally of said shank and a shoulder extending laterally of said shank at the inner end of said base, a bore extending downwardly from said base through the bottom face of said shank, said bore sloping in angular relation away from said one end and toward the opposite end of said shank, a recess formed in the bottom face of said shank communicating with the lower end portion of said bore, a pin slidably mounted in said bore, said pin and bore being of complementary noncircular cross-section to prevent rotary movement of said pin in said bore, a transverse slot formed in the lower end portion of said pin, the upper end of said pin having an offset portion of reduced cross-section protruding through said base, a cutter insert having an opening formed therein positioned on said base, the offset portion of said pin extending through the opening in said cutter insert, a threaded bore formed in said shank extending downwardly from the upper face thereof adjacent said laterally extending shoulder and communicating at its lower end with the recess formed in the bottom face of said shank, a screw stud positioned in said threaded bore, an enlarged head formed on the lower end of said stud and disposed in said recess in the bottom face of said shank, a peripheral portion of said enlarged head slidably mounted within the transverse slot formed in the lower end of said pin, whereby upon turning said screw stud to move the stud into the threaded bore, the pin slides downwardly within the bore of noncircular cross-section to thereby tighten the cutter insert against the shoulder, and by turning the screw stud in the opposite direction to move the stud out of the threaded bore, the pin slides upwardly to thereby loosen the cutter insert.

References Cited by the Examiner

UNITED STATES PATENTS

| | | | |
|---|---|---|---|
| 3,146,656 | 9/1964 | Richards | 29—96 X |
| 3,154,974 | 11/1964 | Greenleaf | 29—96 X |
| 3,226,797 | 1/1966 | Hertel | 29—95 |

FOREIGN PATENTS 1,126,701  3/1962  Germany.

WILLIAM W. DYER, Jr., *Primary Examiner.*

HARRISON L. HINSON, *Examiner.*